(No Model.) 3 Sheets—Sheet 1.
O. A. STEVENS & E. L. DU BARRY.
APPARATUS FOR THE DISTILLATION OF AMMONIACAL LIQUORS.
No. 282,398. Patented July 31, 1883.
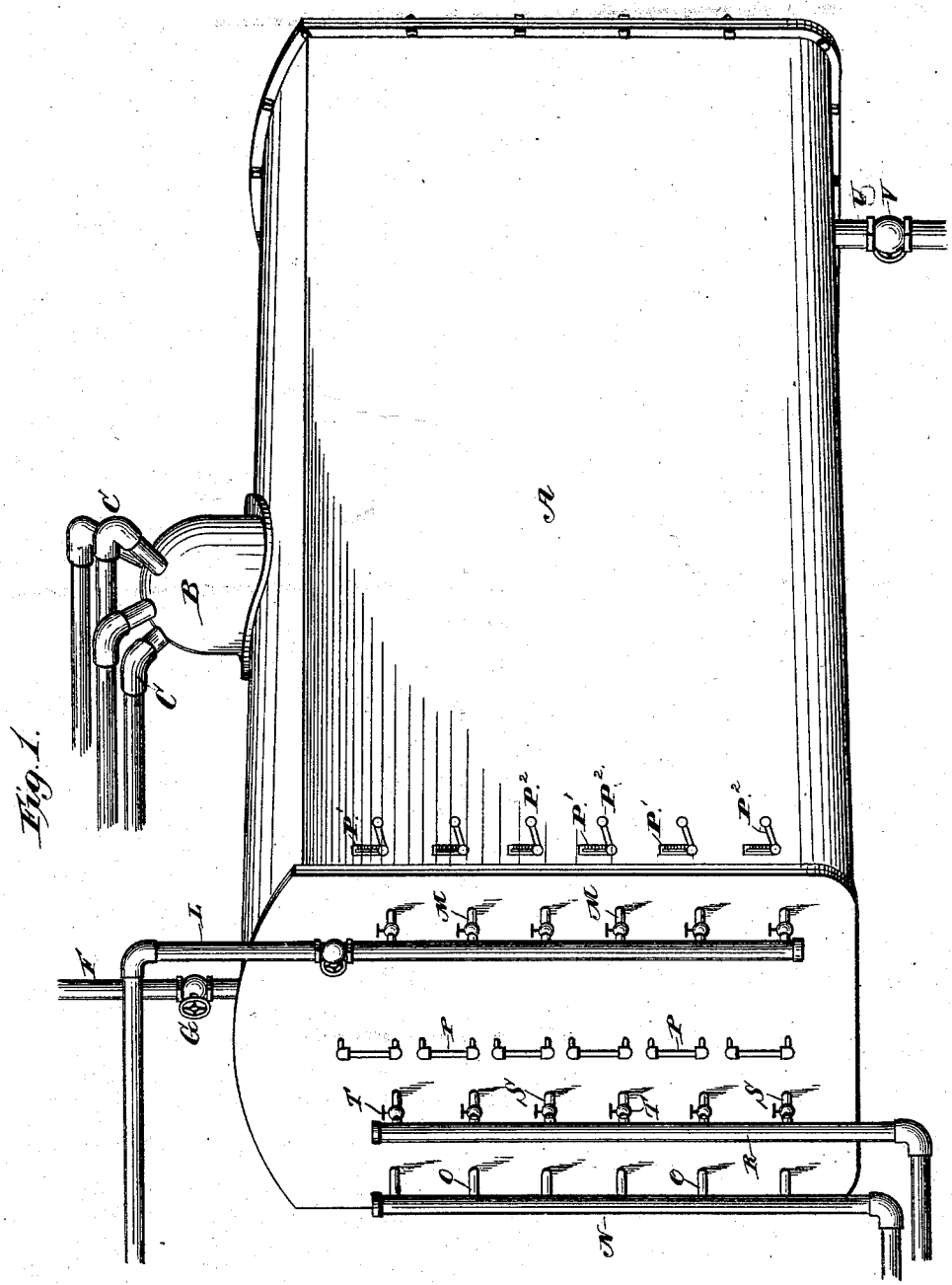
Witnesses.
Robert Everett,
J. A. Rutherford
Inventors.
O. A. Stevens.
E. L. Du Barry.
By James L. Norris.
Atty.
N. PETERS. Photo-Lithographer, Washington, D. C.

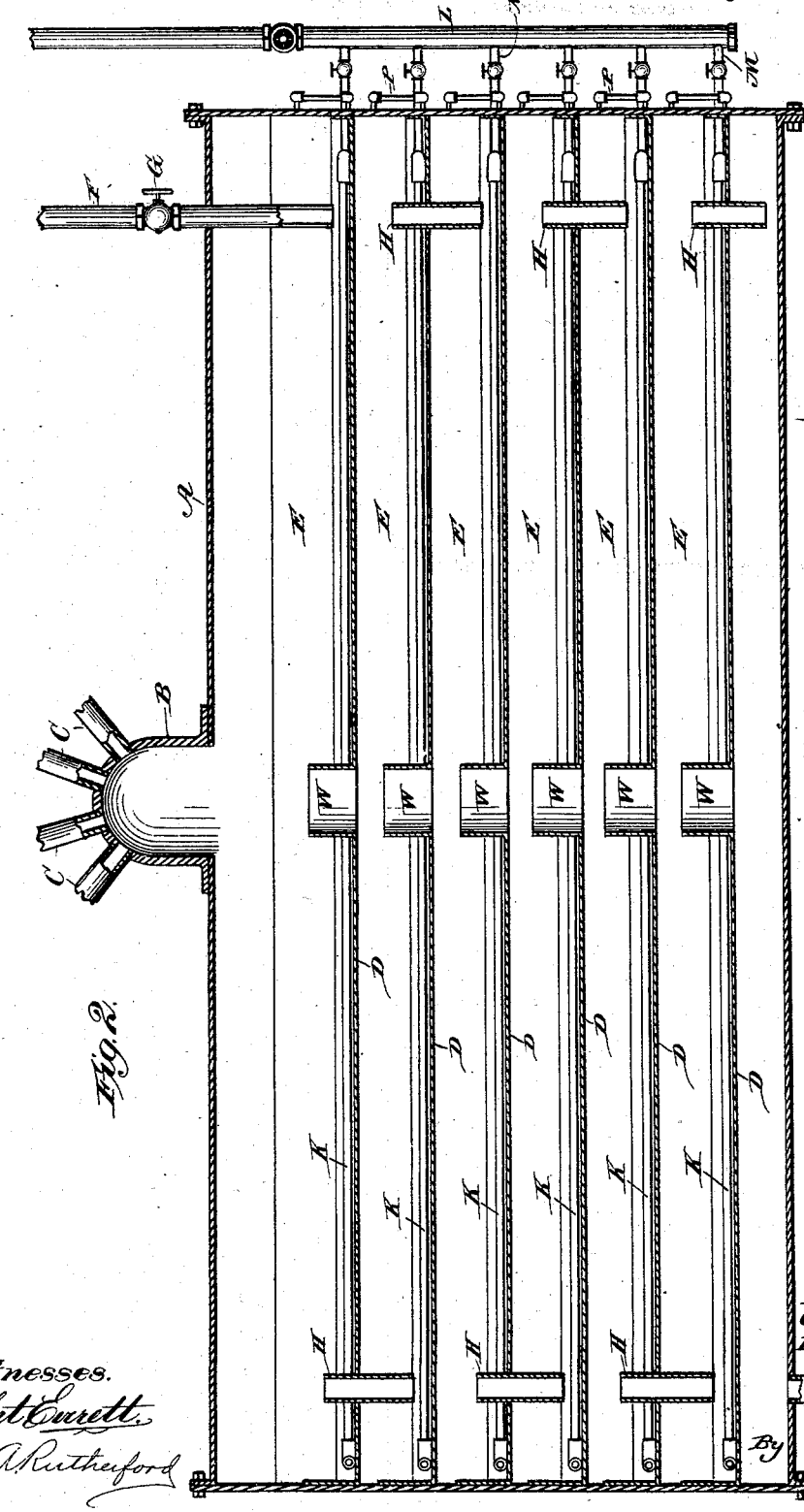

(No Model.) 3 Sheets—Sheet 3.
O. A. STEVENS & E. L. DU BARRY
APPARATUS FOR THE DISTILLATION OF AMMONIACAL LIQUORS.
No. 282,398. Patented July 31, 1883.
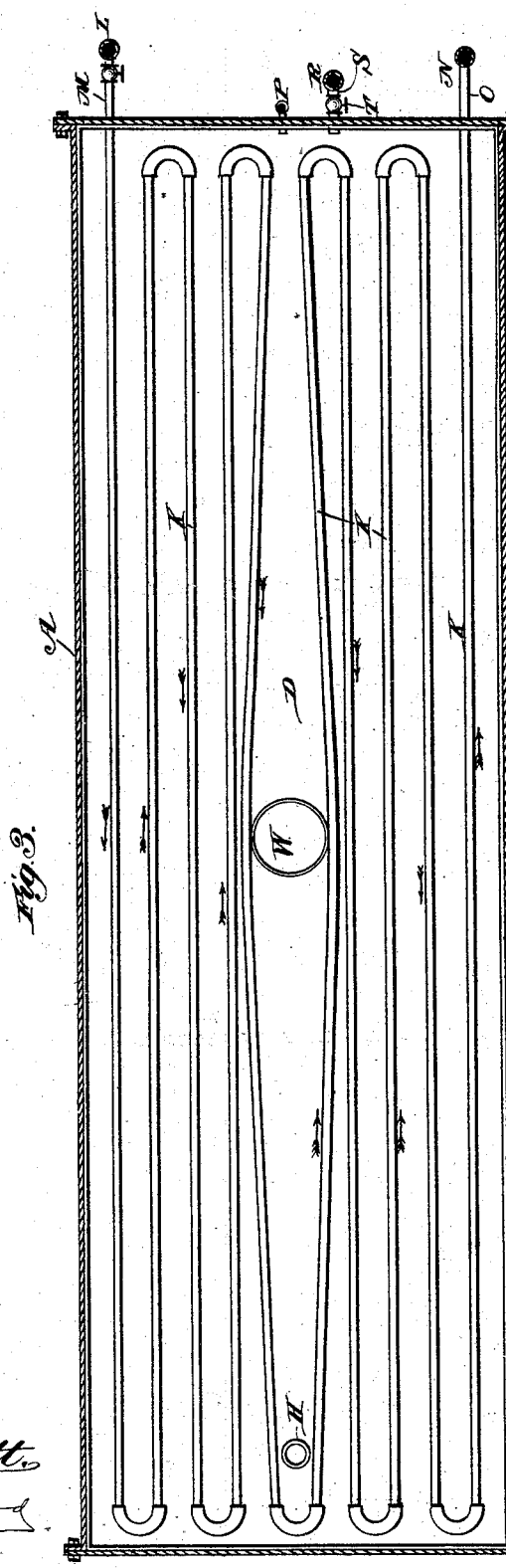
Witnesses.
Robt Ewatt
J. A. Rutherford
Inventors.
O. A. Stevens,
E. L. Du Barry.
By James L. Norris
Atty

United States Patent Office.

OSCAR A. STEVENS AND EDMUND L. DU BARRY, OF WASHINGTON, D. C.

APPARATUS FOR THE DISTILLATION OF AMMONIACAL LIQUORS.

SPECIFICATION forming part of Letters Patent No. 282,398, dated July 31, 1883.

Application filed July 12, 1882. (No model.)

*To all whom it may concern:*

Be it known that we, OSCAR A. STEVENS and EDMUND L. DU BARRY, both citizens of the United States, residing at Washington, in the District of Columbia, have invented new and useful Improvements in Separating Ammonia and other Gases from Gas-Liquor, of which the following is a specification.

This invention relates to certain improvements in apparatus for separating ammoniacal and other gases from gas-liquors; and it has for its objects to provide suitable means and apparatus whereby the gas-liquor may be supplied in proper quantities, and suitably and economically heated to expel the gases, and conveniently regulated as it is supplied, as more fully hereinafter specified. These objects we attain by the apparatus illustrated in the accompanying drawings, in which—

Figure 1 represents a perspective view of our improved apparatus, showing the connections for supplying the gas-liquor to the same for heating the apparatus, for observing the contents of the interior, and for the escape of the waste and products of condensation. Fig. 2 represents a longitudinal sectional view of the apparatus, showing the internal arrangement of the same; and Fig. 3, a horizontal sectional view of the upper part of the apparatus, showing one of the evaporating-pans and its system of heating-pipes.

The letter A indicates a closed vessel of any suitable shape and capacity, which is provided with a removable head at either end, in order that its interior may be readily inspected for cleansing or repairs. The said vessel is provided with a dome, B, on top, from which extend a series of pipes, C, to a suitable condenser or settler, or a series of such. Within said vessel is located a series of evaporating-pans, D, which extend from end to end of said vessel, dividing the same into a number of evaporating-compartments, E. Through the crown of the said vessel A extends a pipe, F, provided with a valve or cock, G, the lower or inner end extending to near the bottom of the upper evaporating-pan in said vessel, and the outer or upper end being connected with a suitable reservoir from which the gas-liquor may be supplied.

The pans alternately at opposite ends are provided with overflow-tubes H, the upper ends of which are upon a level to which the gas-liquor is intended to rise in the said pans, so that when the liquor rises in the pans above said level it will pass automatically to the succeeding pans without emptying the pans above. The lower ends of the tubes H extend to such a point below the level of the liquor collected in the succeeding pans below so as to form seals and prevent the passage of gas upward through them.

The letter K indicates a series of steam-pipes, located, respectively, at the bottom of each of the evaporating-pans of the series. These connect with a steam-induction pipe, L, leading from a suitable boiler, by means of the valved branch pipes M, and with an eduction-pipe, N, by means of branch pipes O, whereby the waste steam may escape.

The letter P indicates a series of glass gages similar to the glass gages of an ordinary steam-boiler. One is provided for each pan, and extends outward and in front of the vessel or chamber A, communicating with the lower portions of the pans, and with the compartments which they form, so as to indicate the height of the liquor in each from the outside.

The letter R indicates an eduction-pipe communicating with the respective evaporating-pans by means of the branches S, which are provided with cocks or valves T, by means of which the contents of any or all of the pans may be discharged at will; and U indicates a pipe provided with a valve, V, by means of which the vessel A may be emptied when desired.

In order to provide for the free escape of the vapors from the successive pans and the compartments which they form, directly beneath the dome in each pan of the series is located a tube or man-hole, W, which extends upward above the level of the overflow-tubes H, so that they will present a free passage for gases evolved from the liquor in the successive pans, and at the same time prevent the liquor from descending from one pan to the other. When the removable head joins the ends of the pans, a lead or other packing may be interposed to form a tight joint between the compartments to prevent their communication except through the proper passages.

As thus constructed, it will be seen that an extensive evaporating-surface is secured, and that the gases not separated in the first pan or shelf will, with the liquor, pass to the pan below and be further submitted to the action of heat, and so on, until all the gas is freed and carried to the settlers.

The vertical pipes H, dipping at their lower ends into the liquor, form seals which prevent the gas from escaping upward through the same, while they form channels for the incoming cold liquor which displaces the hot liquor in the pans. The inflow, it will be seen, is continuous, and can be inspected from the front, so as to indicate when it is necessary to regulate it.

The improved apparatus is designed to be employed in connection with any of the known apparatus for separating ammoniacal and other gases from gas-liquor, and may be connected with any suitable apparatus for burning noxious gases, so as not to contaminate the atmosphere. We also propose providing a series of thermometers, P', one for each compartment E, so that the temperature of the liquors in the pans can be readily ascertained. These thermometers will be fixed in openings formed in the vessel A, and in order to thoroughly expose the thermometers to the liquor a short tube, P², can be provided for each thermometer, and arranged so as to communicate with the interior of the vessel and connect with the exterior of the thermometer-bulb, thus allowing the liquor to come into intimate contact with all sides of the said bulb. A manhole can also be provided for each compartment, whereby access can be had thereto without removing the head.

We are aware that stills have been heretofore known consisting of a tank containing the crude material, which flows by its own gravity into a coil in the boiler, said coil being produced and passing through a series of chambers in communication with the boiler, the temperature of each chamber in the series increasing with relation to the preceding chamber, and each being connected by a separate pipe with a condenser, the material undergoing distillation being contained both within and outside of the several coils.

Having thus described our invention, what we claim is—

1. In combination with the closed vessel of the evaporating-pans, each provided with separate heating-pipes and supply and eduction connections, and the central passages or manholes for the escape of gases from the successive pans, substantially as specified.

2. The combination, with the closed vessel, of the evaporating-pans located therein, the liquor-supply and connecting pipes, the steam heating and eduction pipes, the gages, and the central gas-escape pipes extending upward through the pans, the whole arranged substantially as herein specified, for the purposes set forth.

In testimony whereof we have hereunto set our hands in the presence of two subscribing witnesses.

O. A. STEVENS.
EDMUND L. DU BARRY.

Witnesses:
JAMES LAWSON NORRIS,
JAMES A. RUTHERFORD.